United States Patent
Wessel et al.

(10) Patent No.: US 8,434,414 B2
(45) Date of Patent: May 7, 2013

(54) MULTI-DIRECTIONAL MOBILE ROBOTIC CELL

(75) Inventors: Brent Wessel, Fort Collins, CO (US); Lance F. Guymon, Fort Collins, CO (US); Michael Olson, Loveland, CO (US)

(73) Assignee: Rimrock Automation, Inc., Fort Collins, CO (US)

( * ) Notice: Subject to any disclaimer, the term of this patent is extended or adjusted under 35 U.S.C. 154(b) by 244 days.

(21) Appl. No.: 12/878,121

(22) Filed: Sep. 9, 2010

(65) Prior Publication Data

US 2011/0214586 A1  Sep. 8, 2011

Related U.S. Application Data

(60) Provisional application No. 61/240,702, filed on Sep. 9, 2009.

(51) Int. Cl.
*B61B 12/02* (2006.01)

(52) U.S. Cl.
USPC .......................................................... 104/98

(58) Field of Classification Search ................ 104/23.1, 104/23.2, 96, 98, 287, 155, 196
See application file for complete search history.

(56) References Cited

U.S. PATENT DOCUMENTS

| | | | | |
|---|---|---|---|---|
| 4,616,960 A | * | 10/1986 | Gladish | 406/88 |
| 5,119,732 A | * | 6/1992 | Lisy | 104/48 |
| 6,096,164 A | * | 8/2000 | Benson et al. | 156/425 |
| 2006/0137544 A1 | * | 6/2006 | Liu et al. | 99/485 |

* cited by examiner

*Primary Examiner* — R.J. McCarry, Jr
(74) *Attorney, Agent, or Firm* — William W. Cochran; Cochran Freud & Young LLC

(57) ABSTRACT

Disclosed is a mobile robotic arm workcell. A robotic arm is mounted on a superstructure that carries all the equipment associated with the workcell's task. Thus, the workcell is self-contained needing only power. The workcell may be moved by activating air bearings that are pressurized by an air compressor that is also mounted on the superstructure. Power is received via power contacts that engage a power rail. Guidance is provided a guide system. The guide system may include guide rails engaged by guide carriages. Propulsion is provided by a drive system that may engage the guide system or the factory floor.

20 Claims, 9 Drawing Sheets

MULTI-DIRECTIONAL MOBILE ROBOTIC CELL

CROSS-REFERENCE TO RELATED APPLICATION

This application is based upon and claims priority to U.S. provisional application Ser. No. 61/240,702, filed Sep. 9, 2009, entitled "Multi-Directional Mobile Robotic Cell," which application is specifically incorporated herein by reference for all that it discloses and teaches.

BACKGROUND OF THE INVENTION

Industrial robots may be used to perform repetitive tasks such as the welding of component parts together, cutting, routing, grinding, and polishing. Typically, the robot always repeats a specific preprogrammed task. The products which are usually worked on by the robot may have a specific support structure, or jig, that support the product at a precise location in relation to the robot. In another application, industrial robots are used to position products at a precise location so that they may be worked on by another robotic device.

A robotic arm is a robot manipulator with functions that have been compared to a human arm. Joints of a robotic arm may allow rotational motion (such as in an articulated robot) or translational (linear) displacement. The joints of the robotic arm can be considered to form a kinematic chain. Robots and robotic arms are used, for example, in automotive assembly lines.

Robotic arms may be categorized by their degrees of freedom. This number typically refers to the number of single-axis rotational joints in the arm. A higher number indicates an increased flexibility in positioning a tool. Modern robotic arms typically achieve more than six degrees of freedom.

SUMMARY OF THE INVENTION

An embodiment of the invention may therefore comprise a mobile self-contained robotic workcell, comprising: a multi-degree of freedom robot arm; a gantry supporting said robot arm; an air bearing that selectively lifts said gantry off of a supporting surface for low-friction movement; a first drive system that engages a first drive surface while said gantry is lifted off of said supporting surface by said air bearing to propel said gantry in a first direction; a second drive system that engages a second drive surface while said gantry is lifted off of said supporting surface by said air bearing to propel said gantry in a second direction; a first guide carriage that engages a first guide track, the first guide carriage limiting said gantry to movement in said first direction.

An embodiment of the invention may therefore further comprise a mobile self-contained robotic arm workcell, comprising: a superstructure; a multi-degree of freedom robotic arm supported by said superstructure; at least one air bearing, the at least one air bearing selectively lifting said superstructure from a position resting on a support surface to an elevated position, the elevated position allowing for low friction movement of said superstructure across said support surface; a guide carriage that engages a first guide rail that directs a first movement of said superstructure while said superstructure is moved in said elevated position.

An embodiment of the invention may therefore further comprise a robotic cell workcell, comprising: superstructure means for supporting a multi-degree of freedom robotic arm; air bearing means for selectively lifting said superstructure from a position resting on a support surface to an elevated position, the elevated position allowing for low friction movement of said superstructure across said support surface; drive means for propelling said superstructure across said support surface in at least a first direction and a second direction; guide means for limiting a direction of travel of said superstructure while being propelled across said support surface to one of said first direction and said second direction at a time.

An embodiment of the invention may therefore further comprise a method of moving a robotic arm workcell, comprising: activating an air compressor contained on the workcell that supplies air to an air bearing, the air bearing lifting the workcell from a position resting on a support surface to an elevated position, the elevated position allowing for low friction movement of said workcell across said support surface; engaging a first guide carriage to a first guide rail to limit a movement of said workcell across said support surface to a first direction; engaging a first drive system to propel said workcell across said support surface in said first direction; engaging a second guide carriage to a second guide rail to limit said movement of said workcell across said support surface to a second direction; and, engaging a second drive system to propel said workcell across said support surface in said second direction.

DETAILED DESCRIPTION OF THE EMBODIMENTS

Figure 1:
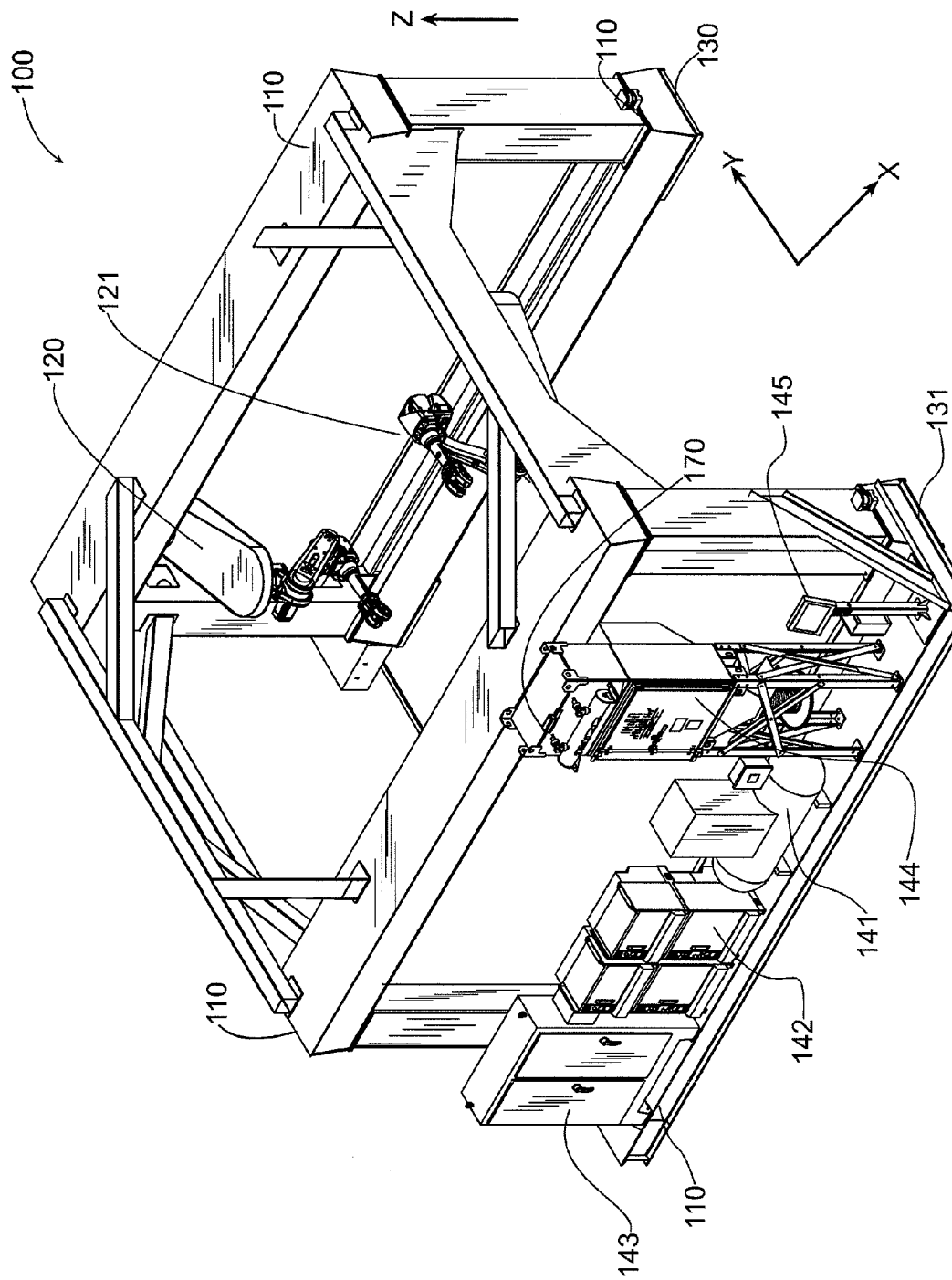
FIG. 1 is a perspective view from above of a mobile self-contained robotic workcell.
Figure 1A:
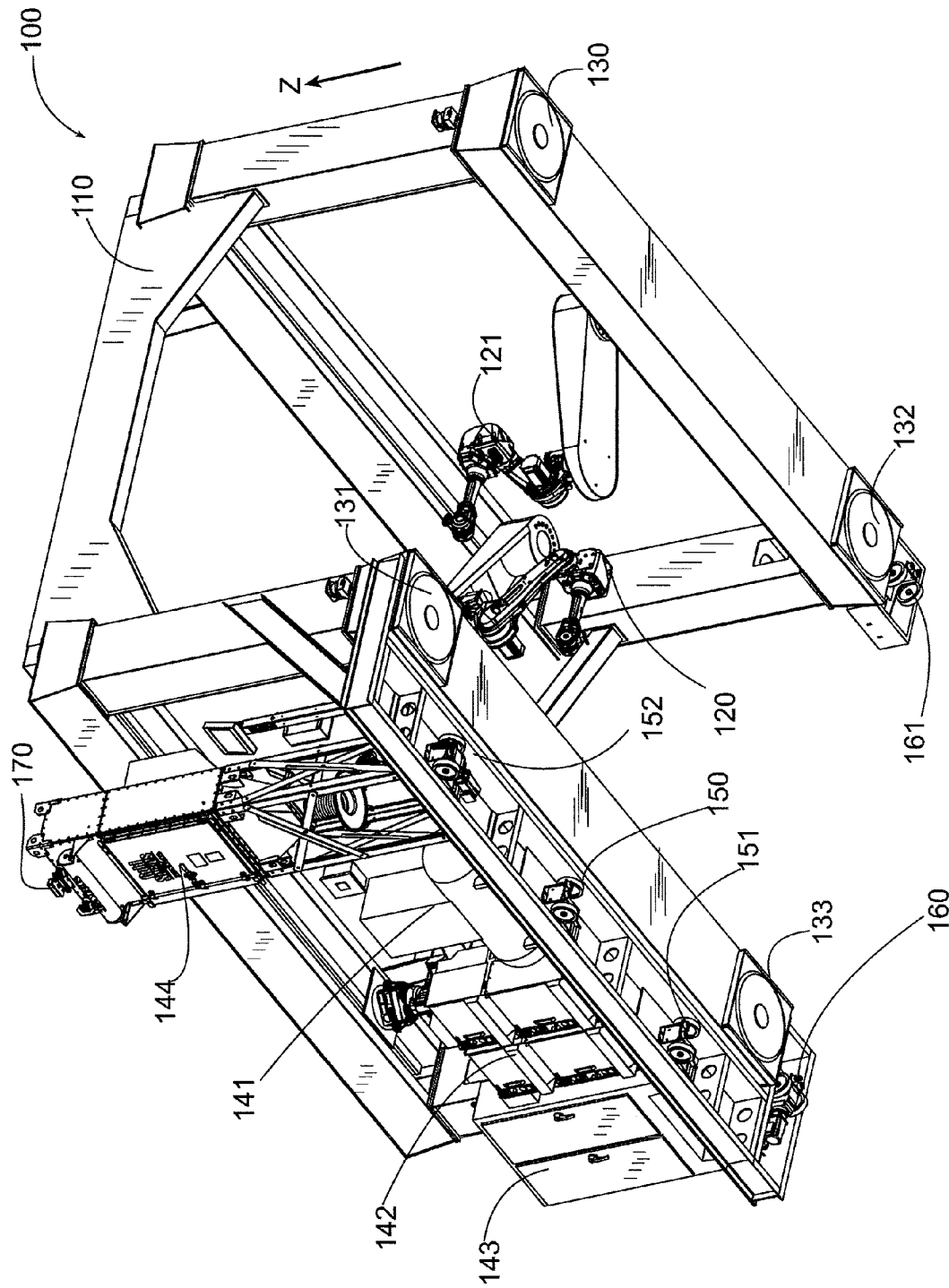
FIG. 1A is a perspective view from below of a mobile self-contained robotic workcell.

FIG. 1 is a perspective view from above of a mobile self-contained robotic workcell. FIG. 1A is a perspective view from below of a mobile self-contained robotic workcell. In FIGS. 1 and 1A, workcell 100 comprises gantry 110, robotic arm 120, robotic arm 121, air bearing 130, air bearing 131, air bearing 132, air bearing 133, air compressor 141, cabinet 142, cabinet 143, dust collector 144, computer display 145, drive carriage 150, drive carriage 151, drive carriage 152, drive carriage 160, drive carriage 161, and power contact 170.

Robotic arms 120-121 are attached to gantry 110. Robotic arms 120-121 may be engaged with gantry 110 via a track or channel so that they may move along the length of gantry 110. In an embodiment, robotic arm 120 and robotic arm 121 are both on the same side of gantry 110. Robotic arm 120 is hung from a track that comprises a top portion of gantry 110. Robotic arm 121 sits on a track that comprises a bottom portion of gantry 110. Thus, because robotic arm 120 and robotic arm 121 are on different tracks, they may pass by each other even though they are on the same side of gantry 110.

In FIGS. 1 and 1A, air compressor 141, cabinet 142, cabinet 143, dust collector 144, and computer display 145 are also attached to gantry 110. Air compressor 141, cabinet 142, cabinet 143, dust collector 144, and computer display 145 are intended to be examples of equipment that may be attached to, and thus moved with, gantry 110.

Other examples of equipment that may be attached to, and thus moved with, gantry 110 include, but are not limited to, welding power supplies, welding gas bottles, welding gas mixers, gas bottles, tool racks, welding wire containers, fume filtration equipment, dust filtration equipment, vision sensor systems, computers, additional air compressors, hydraulic power units, and hydraulic pumps. This list is not intended to be exhaustive. Any equipment or supplies to be used in support of the operations performed by robotic arm 120 or 121 may be attached to, and thus moved by, gantry 110.

Gantry 110 is any suitable superstructure or supporting apparatus with at least one robotic arm 120-121 attached that also carries support equipment (such as air compressor 141 and/or dust collector 144) used in support of the operations performed by robotic arm 120 or 121. Gantry 110 is also capable of being lifted with attached air bearings 130-133 for low friction movement across a supporting surface, such as a factory floor. Air bearings 130-133 may be supplied air from air compressor 141 to lift gantry (and all attached equipment) for low friction movement.

Air bearings 130-133 (a.k.a., air casters) support loads on a cushion of air like an air hockey puck on an air hockey table. Air bearings may use a flexible diaphragm beneath the load support surface. Compressed air is pumped into the diaphragm and passes through holes in the diaphragm holes and into a plenum beneath, thereby raising the supported load off the floor. Air that is forced out between the diaphragm and the floor forms a thin lubricating air film that allows for low friction movement of the supported load (e.g., workcell 100). Since the diaphragm is flexible, it can deflect as it encounters obstacles, or fill out as it passes over depressions in the surface.

In an embodiment, air bearings 130-133 may selectively lift gantry 110 for low-friction movement across a factory floor. One or more of drive carriages 150-152 may engage a drive surface while said gantry is lifted. One or more of drive carriages 150-152 may propel gantry 110 in a first direction. To move gantry 110 in a second direction (e.g., a direction substantially perpendicular to the first direction), one or more of drive carriages 160-161 may engage a different part of the drive surface to propel gantry 110 in the second direction. This is illustrated in FIG. 1A with drive carriages 160-161 and 150-152 being orientated at approximately 90° to each other. Drive carriages 150-152 and 160-161 may be or include, or be steered by, guide carriages that engage guide rails or otherwise provide a guide system.

Figure 2:
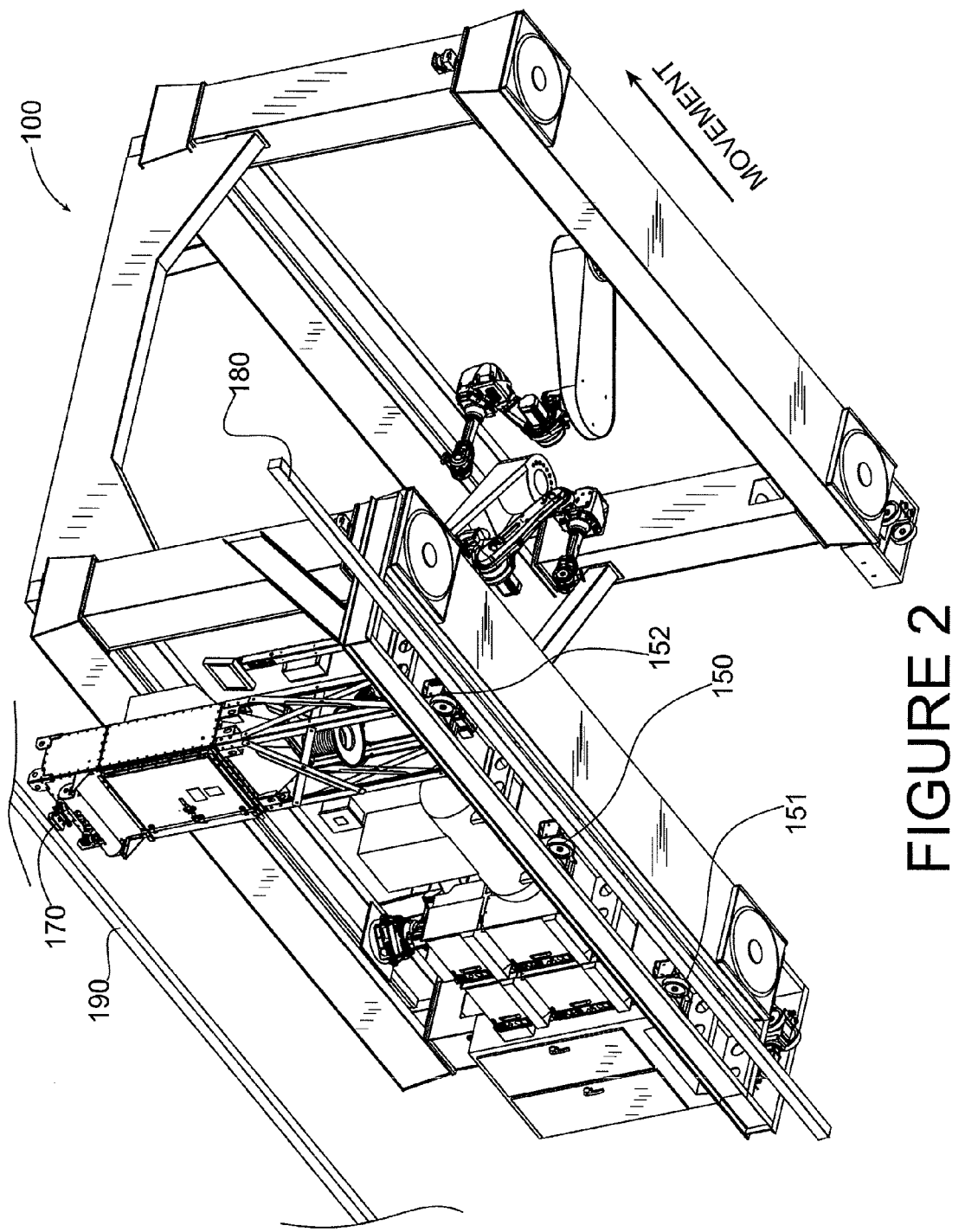
FIG. 2 is a perspective view from below of a mobile self-contained robotic workcell engaged with a first guide rail and a first power rail.

FIG. 2 is a perspective view from below of a mobile self-contained robotic workcell engaged with a first guide rail and a first power rail. In FIG. 2, drive carriages 150-152 are shown engaged with guide rail 180. Power contact 170 is shown engaged with power rail 190.

In an embodiment, one or more of drive carriages 150-152 engage a guide rail 180. When one or more of drive carriages 150-152 is engaged with guide rail 180, gantry 110 is limited to movement along guide rail 180. Typically, guide rail 180 will be fixed in relation to the floor. Guide rail 180 is shown in FIG. 2 as being straight. However, guide rail 180 may be curved or have other shapes.

Power contact 170 engages power rail 190. When power contact 170 is engaged with power rail 190, the equipment of workcell 100 (such as compressor 141 and drive carriages 150-152) may be powered through power rail 190. Typically, power rail 190 is fixed in relation to guide rail 180 so that the equipment of workcell 100 may be powered through power rail 190 while workcell 100 is moving along guide rail 180.

Figure 3:
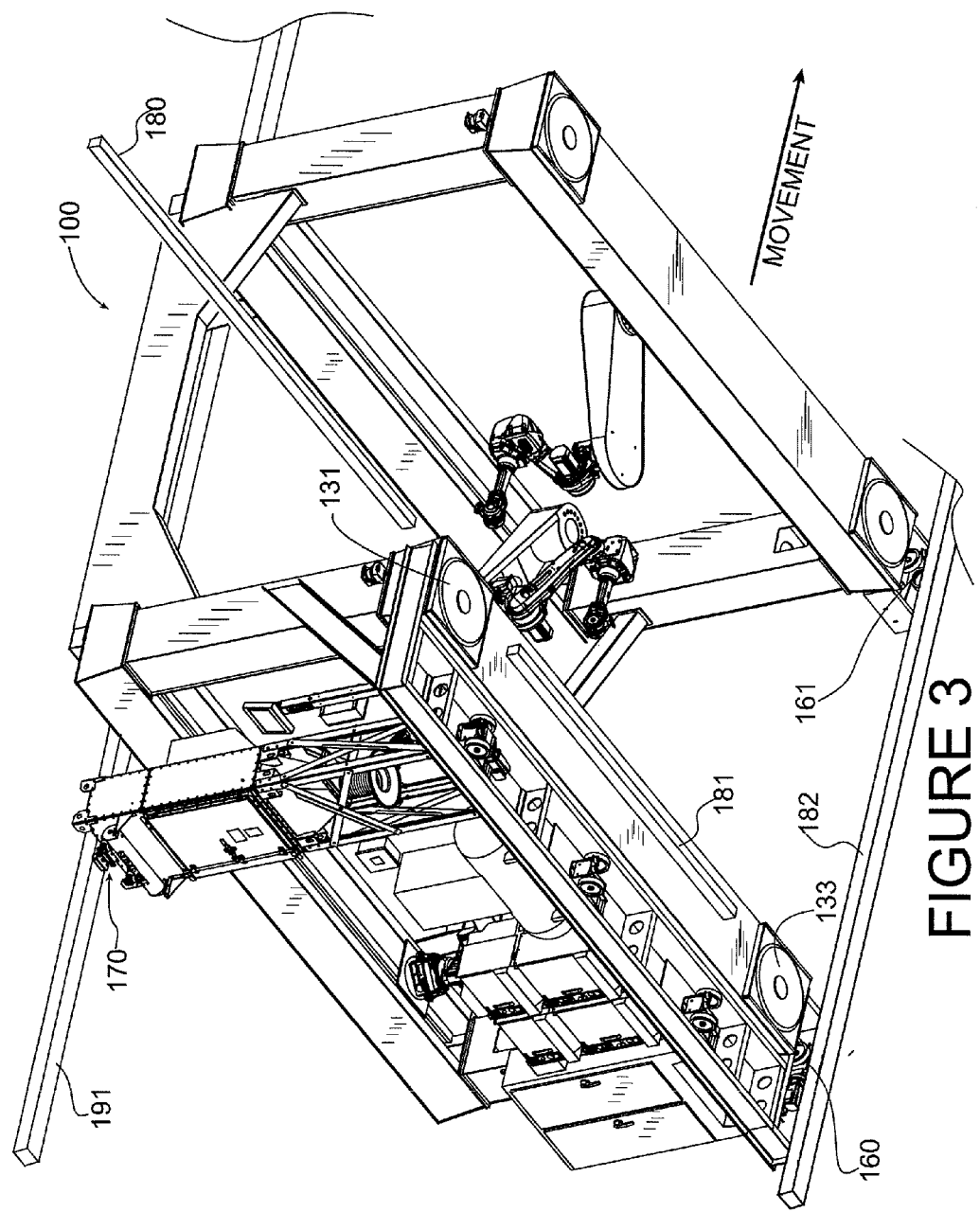
FIG. 3 is a perspective view from below of a mobile self-contained robotic workcell engaged with a second guide rail and a second power rail as the air bearings pass through a gap in the first guide rail.

FIG. 3 is a perspective view from below of a mobile self-contained robotic workcell engaged with a second guide rail and a second power rail as the air bearings pass through a gap in the first guide rail. In FIG. 3, drive carriages 160 and 161 are shown engaged with guide rail 182. Power contact 170 is shown engaged with power rail 191. It should be understood that guide rail 182 is oriented at substantially a perpendicular angle to guide rails 180 and 181. Likewise, power rail 191 is oriented at substantially a perpendicular angle to power rail 190.

In an embodiment, one or more of drive carriages 160 and 161 engage guide rail 182. When one or more of drive carriages 160 and/or 161 is engaged with guide rail 182, gantry 110 is limited to movement along guide rail 182. Typically, guide rail 182 will be fixed in relation to the floor. Guide rail 182 is shown in FIG. 3 as being straight. However, guide rail 182 may be curved or have other shapes.

In an embodiment, guide rails 180-182 may have gaps to allow air bearings 130-133 to cross the alignment of a guide rail 180-182 without interference. In FIG. 3, this is shown by a gap between guide rail 180 and guide rail 181 with air bearing 131 disposed in that gap. Guide rail 181 is substantially in line with guide rail 180. Thus, guide rail 181 may be thought of as an extension of guide rail 180. In an embodiment, the number of, and position of, drive carriages 160-162 is selected such that at least two of drive carriages 160-162 are always engaged with guide rail 180, guide rail 181, or both, when gantry 110 is moving in the direction controlled by guide rails 180 and 181.

Power contact 170 engages power rail 191. When power contact 170 is engaged with power rail 191, the equipment of workcell 100 (such as compressor 141 and drive carriages 160-161) may be powered through power rail 191. Typically, power rail 191 is fixed in relation to guide rail 182 so that the equipment of workcell 100 may be powered through power rail 191 while workcell 100 is moving in the direction of guide rail 182.

Figure 4:
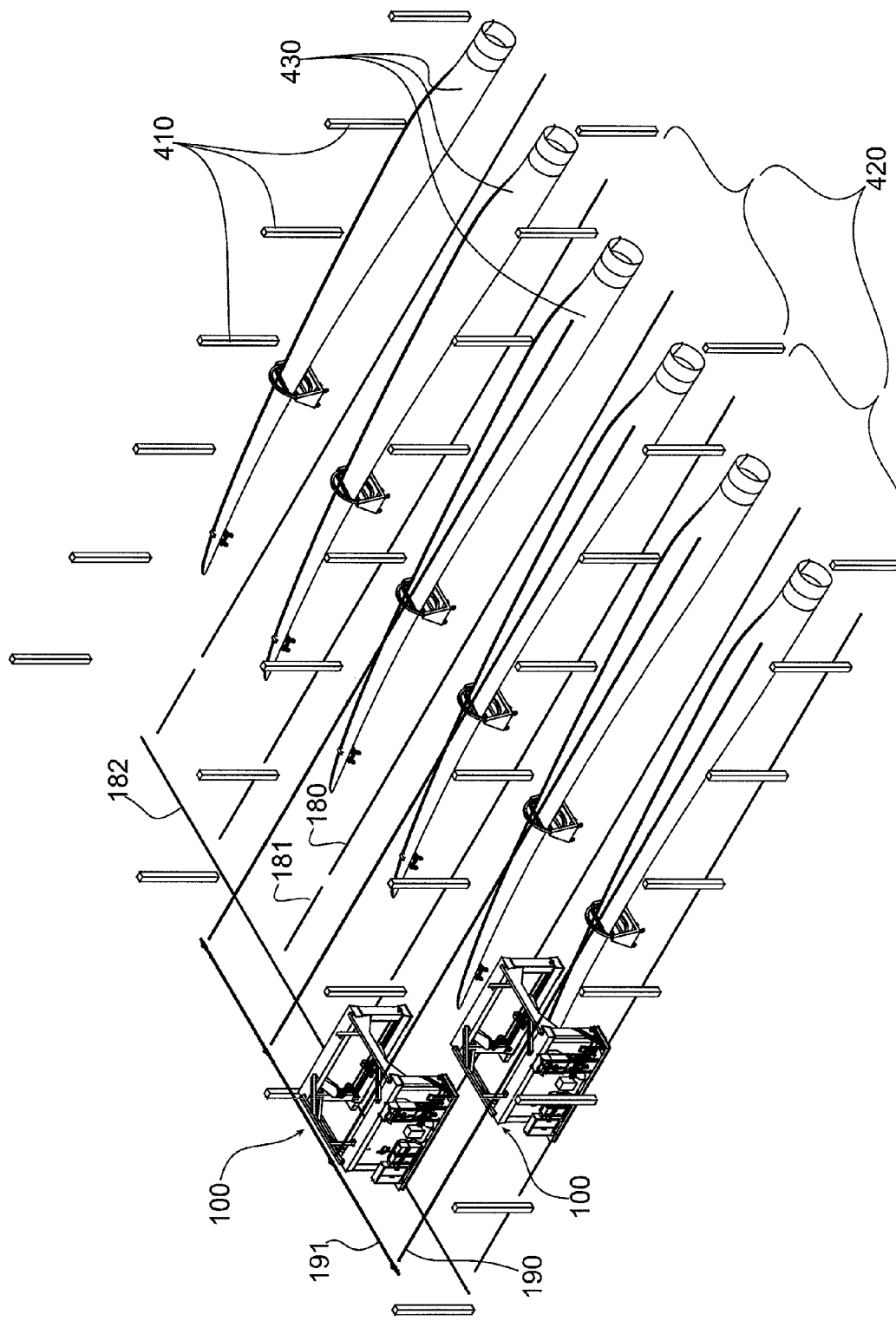
FIG. 4 is a perspective view of a factory floor showing a first layout of guide and power rails.

FIG. 4 is a perspective view of a factory floor showing a first layout of guide and power rails. The layout shown in FIG. 4 corresponds to the guide rail layout shown in FIGS. 2 and 3.

In FIG. 4, several workcells 100 are shown. These workcells 100 are guided by guide rails 180 and 181 to move in a first direction. The workcells 100 are also guided to move in a second direction by guide rail 182. The second direction appears to be substantially perpendicular to the first direction.

The factory shown in FIG. 4 has several long workbays 420 defined by columns 410. Disposed within workbays 420 are work pieces 430. The orientation of guide rails 180 and 181 allow workcells 100 to move along the length of workbays 420 and thus operate on work pieces 430. The orientation of guide rail 182 allows workcells 100 to move between workbays 420 and/or work pieces 430. The length of workcells 100 is selected such that workcell 100 may pass between the columns 410 of the factory to move between work bays 420. Note the gaps between guide rail 180 and guide rail 181, and guide rail 181 and guide rail 182 that allow air bearings 130-133 to move along guide rail 182 without interference from rails running the length of the workbays 420.

Workcell 100 may be moved as follows: Air compressor 141 contained on workcell 100 may supply air to air bearings 130-133. This allows air bearings 130-133 to lift workcell 100 from a position resting on the floor to an elevated position. This elevated position allows for low friction movement of workcell 100 across the floor. Drive carriages 150-152, or a separate guide carriage, is engaged with guide rail 180 to limit the movement of workcell 100 across the floor to a first direction. One or more of drive carriages 150-152 are engaged to propel workcell 100 across the floor in the first direction. To move workcell 100 in a different direction, drive carriages 160-161, or a separate guide carriage is engaged, with a guide rail 182 to limit the movement of workcell 100 across the floor to the second direction. One or more of drive carriages 160-161 are engaged to propel workcell 100 across the floor in the second direction. As workcell 100 moves along guide rails 180-182, power contact 170 may engage power rails 190-191 (and additional power rails, as needed) to at least power air compressor 141 which keeps air bearings 130-133 activated.

When workcell 100 has reached its desired position (e.g., a new workbay 420, or work piece 430) in the second direction, drive carriages 150-152, or a separate guide carriage, may be engaged with another guide rail at the new position to limit the movement of workcell 100 across the floor to the first direction. One or more of drive carriages 150-152 may then be engaged to propel workcell 100 along the new workbay 420, or work piece 430. In addition, a new power rail may be engaged to receive power for compressor 141 during the movement and operation of workcell 100 along the new workbay 420, or work piece 430. When workcell 100 reaches a desired position along the new workbay 420, or work piece 430, air bearings 130-133 may be deactivated to lower workcell 100 to a position resting on the floor. This resting position provides a stable platform for the operation of workcell 100. Once resting, one or more of robotic arms 120-121 may be activated to operate on a work piece 430.

In FIG. 4, the work pieces are shown as wind turbine blades. It should be understood, however, that this is only an example and that other types of work pieces 430 are envisioned. Likewise, the workbays 420 of the factory shown in FIG. 4 are long in relation to their width. This is also only an example and other types and geometries of workbays and work pieces are envisioned.

Figure 5:
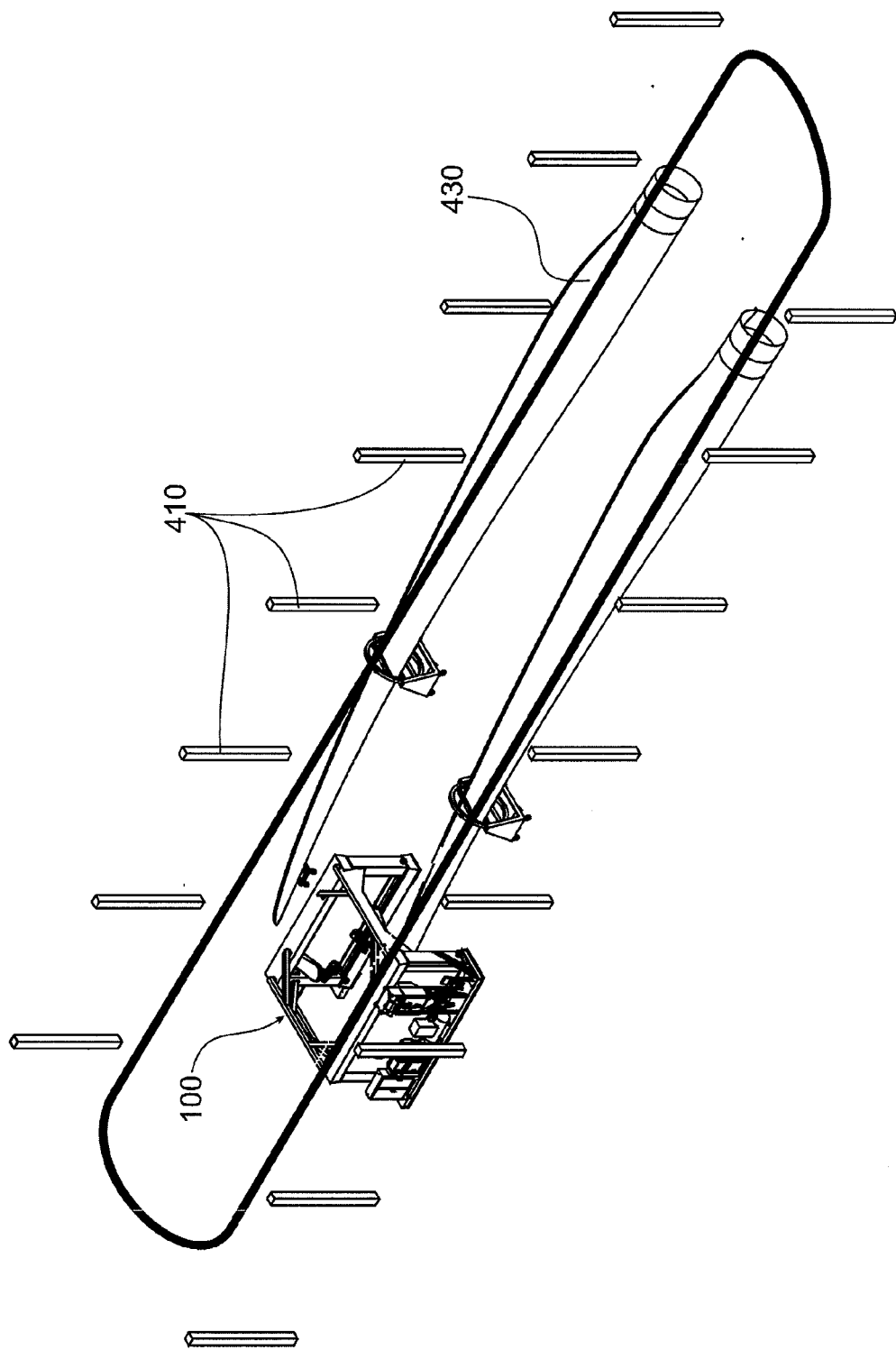
FIG. 5 is a perspective view of a factory floor showing a looped track.

FIG. 5 is a perspective view of a factory floor showing a looped track. As discussed previously, guide rails 180-182 may have non-straight shapes. FIG. 5 illustrates an example of a non-straight shape. As can be seen from FIG. 5, workcell 100 may be guided within the confines of columns 410 in a loop that encompasses multiple work pieces 430.

Figure 6:
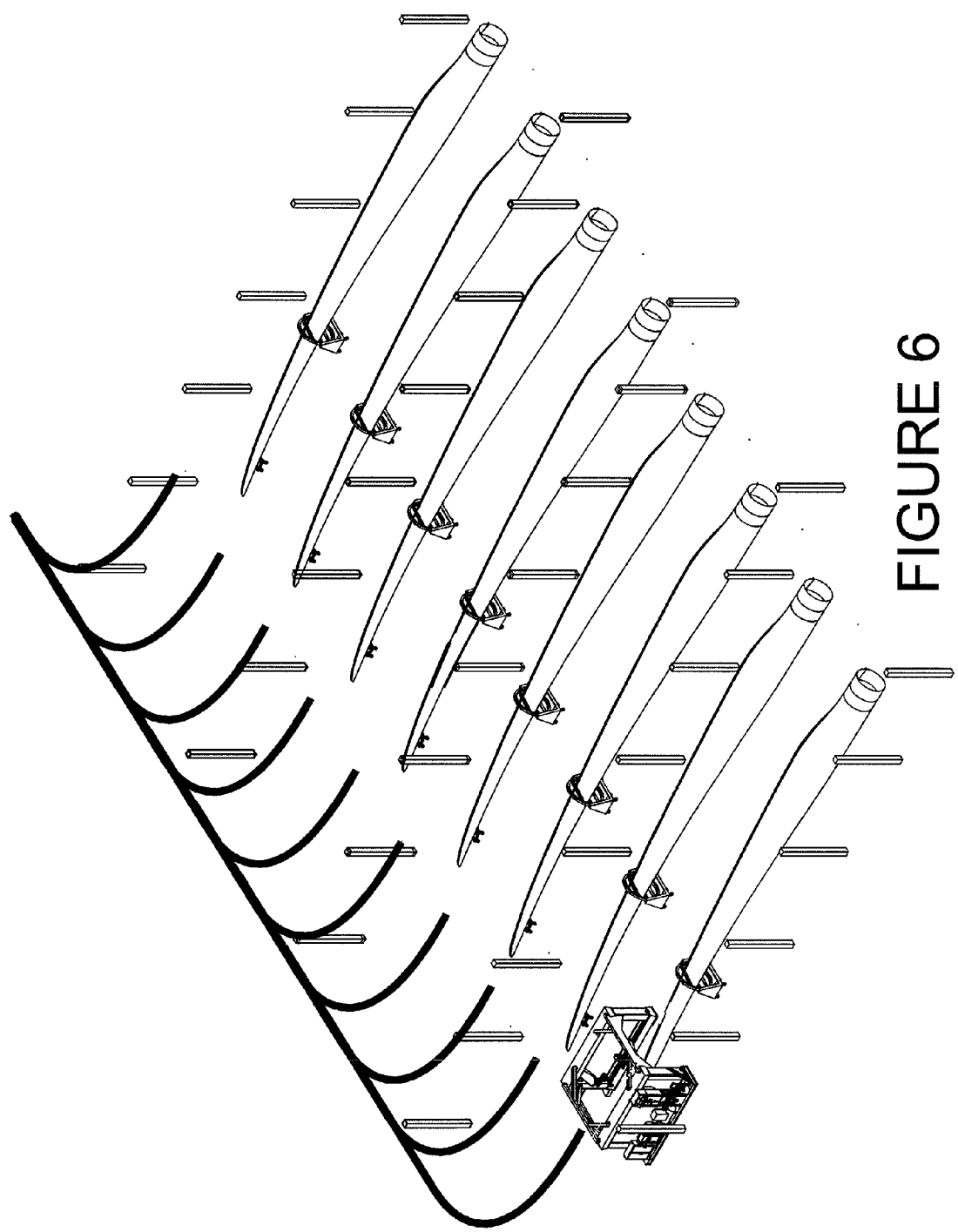
FIG. 6 is a perspective view of a factory floor showing a switchyard track.
Figure 7:
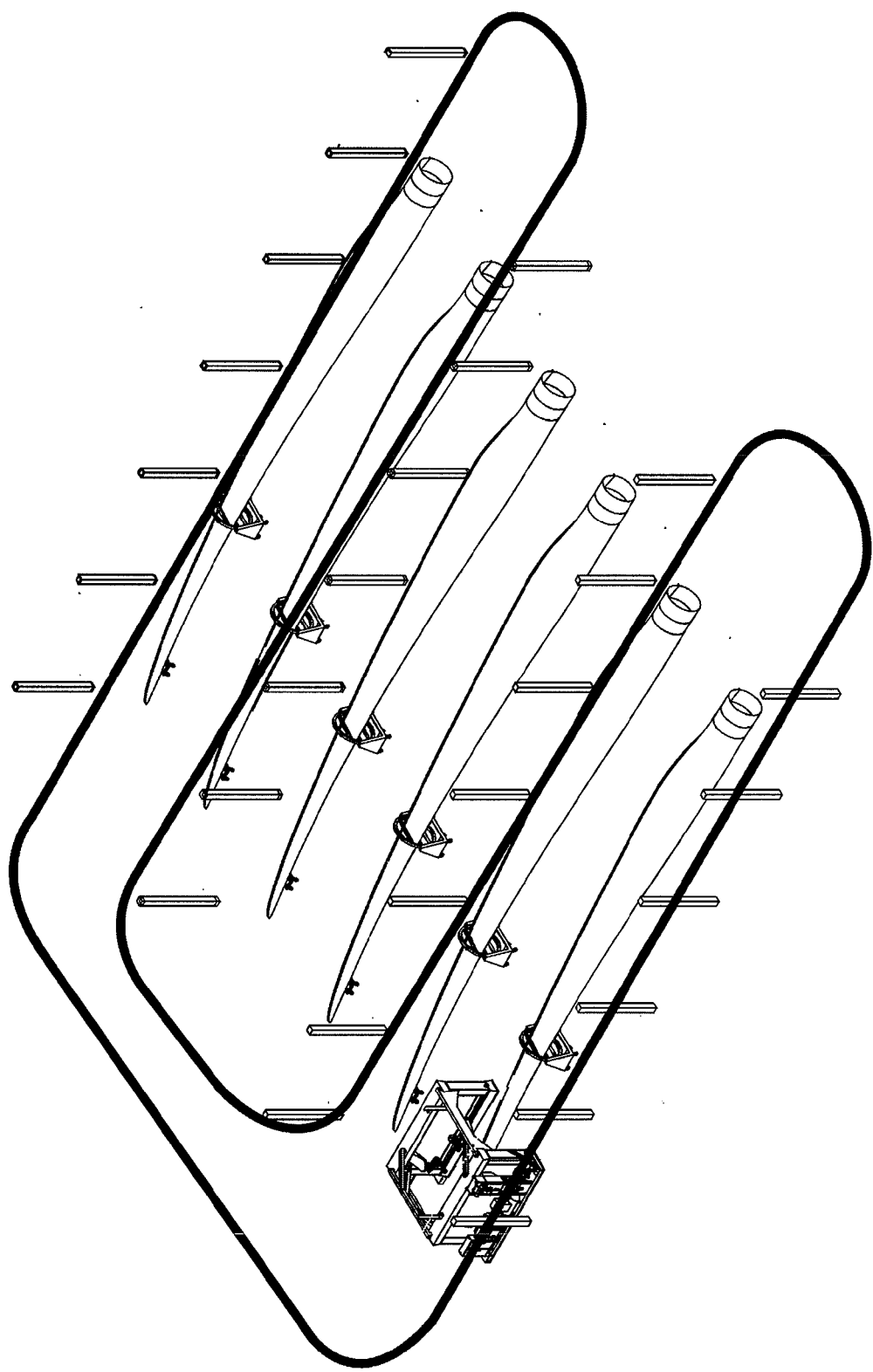
FIG. 7 is a perspective view of a factory floor showing a multi-bay loop track.

FIG. 6 is a perspective view of a factory floor showing a switchyard track. In FIG. 6, workcell 100 is gradually guided from a first direction to a second direction at the end of a workbay 420. A rail switching device (not shown) may then be repositioned to guide workcell 100 into a different workbay 420 and/or work piece 430. FIG. 7 is a perspective view of a factory floor showing a multi-bay loop track.

In FIGS. 2-4, workcell 100 is shown being guided by guide rails 180-182. It should be understood that workcell 100 may be guided by other guidance means. For example, the workcell may be guided by overhead rails. These rails may also supply power to workcell 100.

In an embodiment, workcell 100 may be controlled manually through the use of a pendant. The manual movement of workcell 100 may be freeform without any automatic guidance or set path (using, for example, a joystick). In another embodiment, movement is controlled manually but is limited within certain tolerances by a guidance system. In another embodiment, movement is controlled automatically (using, for example, a computer) but is limited within certain tolerances by a guidance system. In another embodiment, movement is controlled by a combination of manual and automatic controls. For example, movement may be controlled by an operator, but automated decisions based on sensors are made regarding such things as speed, turning radius, turning position, stopping position, final location, etc.

In an embodiment, the guidance system may not involve, or rely completely on, guide rails. Guidance systems that may be used to control the movement and positioning of workcell 100 include, but are not limited to: optical systems that follow a painted or taped line on the floor, systems that sense and follow a buried wire or magnetic tape; and, systems that are wirelessly guided using positioning information (e.g., GPS, or differential GPS). Another example of a wireless guidance system that may be used involves a laser system wherein a rotating laser sends a beam to stationary reflectors at known locations. Distance and angle measurements from the reflectors may then be used to calculate a position, or series of positions, of workcell 100. Position measurements may be used by the guidance system to control the movement of workcell 100.

The systems, units, drives, devices, equipment, and functions described above may be controlled by, implemented with, or executed by one or more computer systems. The methods described above may also be stored on a computer readable medium. Many of the elements of workcell 100, comprise, include, or are controlled by computers systems.

Figure 8:
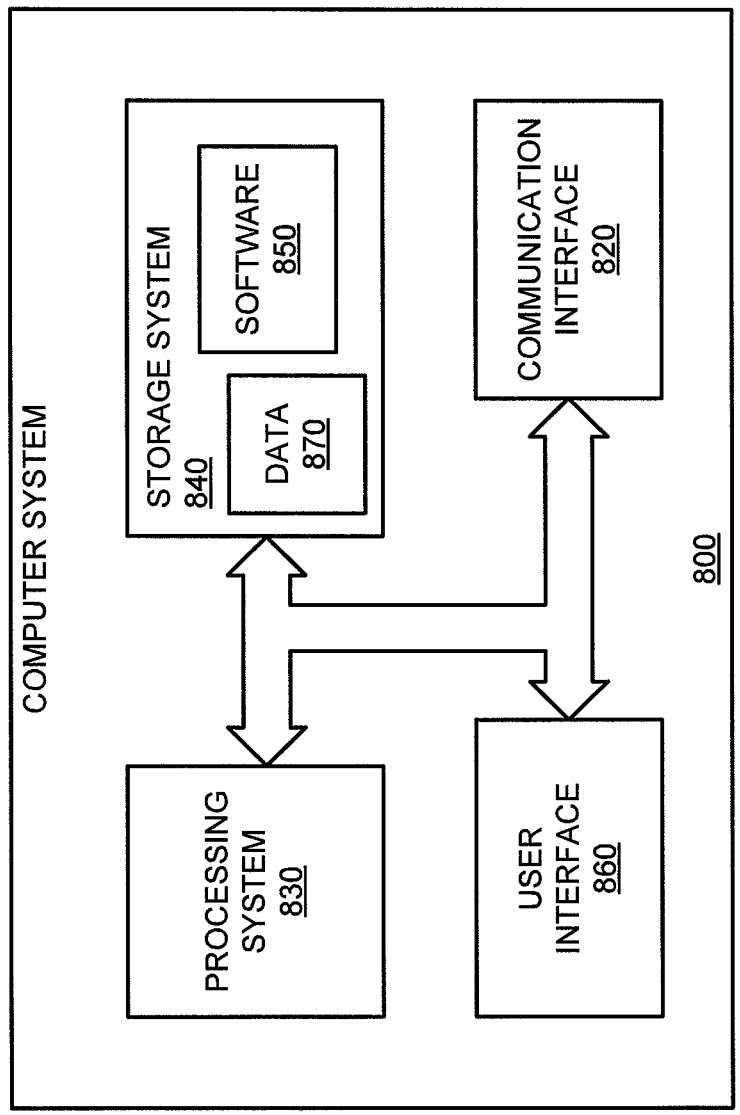
FIG. 8 is a block diagram of a computer system.

FIG. 8 illustrates a block diagram of a computer system. Computer system 800 includes communication interface 820, processing system 830, storage system 840, and user interface 860. Processing system 830 is operatively coupled to storage system 840. Storage system 840 stores software 850 and data 870. Processing system 830 is operatively coupled to communication interface 820 and user interface 860. Computer system 800 may comprise a programmed general-purpose computer. Computer system 800 may include a microprocessor. Computer system 800 may comprise programmable or special purpose circuitry. Computer system 800 may be distributed among multiple devices, processors, storage, and/or interfaces that together comprise elements 820-870.

Communication interface 820 may comprise a network interface, modem, port, bus, link, transceiver, or other communication device. Communication interface 820 may be distributed among multiple communication devices. Processing system 830 may comprise a microprocessor, microcontroller, logic circuit, or other processing device. Processing system 830 may be distributed among multiple processing devices. User interface 860 may comprise a keyboard, mouse, voice recognition interface, microphone and speakers, graphical display, touch screen, or other type of user interface device. User interface 860 may be distributed among multiple interface devices. Storage system 840 may comprise a disk, tape, integrated circuit, RAM, ROM, network storage, server, or other memory function. Storage system 840 may be a computer readable medium. Storage system 840 may be distributed among multiple memory devices.

Processing system 830 retrieves and executes software 850 from storage system 840. Processing system may retrieve and store data 870. Processing system may also retrieve and store data via communication interface 820. Processing system 850 may create or modify software 850 or data 870 to achieve a tangible result. Processing system may control communication interface 820 or user interface 870 to achieve a tangible result. Processing system may retrieve and execute remotely stored software via communication interface 820.

Software 850 and remotely stored software may comprise an operating system, utilities, drivers, networking software, and other software typically executed by a computer system. Software 850 may comprise an application program, applet, firmware, or other form of machine-readable processing instructions typically executed by a computer system. When executed by processing system 830, software 850 or remotely stored software may direct computer system 800 to operate as described herein.

In an embodiment, a mobile self-contained robotic workcell, may include a multi-degree of freedom robot arm, a gantry supporting the robot arm, an air bearing that selectively lifts the gantry off of a supporting surface for low-friction movement, a first drive system that engages a first drive surface while the gantry is lifted off of the supporting surface by the air bearing to propel the gantry in a first direction, a second drive system that engages a second drive surface while the gantry is lifted off of the supporting surface by the air bearing to propel the gantry in a second direction, and, a first guide carriage that engages a first guide track, the first guide carriage limiting the gantry to movement in the first direction. The workcell may also include an air compressor supported by the gantry that supplies compressed air to the air bearing for selectively lifting the gantry off of the supporting surface. The workcell may also include power rail contacts that provide power to at least one device supported by the gantry. The at least one device may include the robot arm. The robot arm may have at least 5 degrees of freedom.

The first direction may be determined by a first guide rail that is fixed in relation to the supporting surface. The second direction may be determined by a second guide rail that is also fixed in relation to the supporting surface. The second direction may be approximately perpendicular to the first direction. The supporting surface may include the first drive surface and the second drive surface. The two drive surfaces may overlap.

The first drive system may be steered by a first guide rail that is fixed in relation to the supporting surface. The second drive system may be steered by a second guide rail. The first guide rail may include a plurality of discontinuous sections. At least two of the plurality of discontinuous sections may be separated in a longitudinal direction by a distance sufficient to allow one or more air bearings to pass between the two of the plurality of discontinuous sections.

In an embodiment, a mobile self-contained robotic arm workcell may include a superstructure, a multi-degree of freedom robotic arm supported by the superstructure, and at least one air bearing. The at least one air bearing may selectively lift the superstructure from a position resting on a support surface to an elevated position. The elevated position may allow for low friction movement of the superstructure across the support surface. A guide carriage that engages a first guide rail may direct a first movement of the superstructure while the superstructure is moved in the elevated position.

Power rail contacts may provide power to at least one device supported by the superstructure. The at least one device may include an air compressor that supplies compressed air to the at least one air bearing. The robot arm may have at least 2 degrees of freedom.

A first guide rail may direct the first movement of the superstructure in a first direction. A second guide rail may direct a second movement of the superstructure in a second direction. The first direction and the second direction may be substantially perpendicular.

The first guide rail and the second guide rail may both direct the superstructure in the first direction. The first guide rail and the second guide rail may be separated by a gap that allows the air bearing to pass in a second direction between the first guide rail and the second guide rail. A second guide carriage may engage the second rail while the first guide carriage is disposed in the gap.

In an embodiment, a robotic arm workcell includes superstructure means for supporting a multi-degree of freedom robotic arm and air bearing means for selectively lifting the superstructure from a position resting on a support surface to an elevated position. The elevated position allows for low friction movement of the superstructure across the support surface. Drive means propel the superstructure across the support surface in at least a first direction and a second direction. Guide means limit a direction of travel of the superstructure while being propelled across the support surface to one of the first direction and the second direction at a time.

Air supply means, which may be supported by the superstructure, may provide compressed air to the air bearing means. Power contact means may provide power to the drive means while the superstructure is being propelled across the support surface. The power contact means may engage a fixed power rail. The guide means may selectively engage a first guide rail to limit the direction of travel of the superstructure while being propelled across the support surface to the first direction. The guide means may engage a second guide rail to limit the direction of travel of the superstructure while being propelled across the support surface to the second direction.

In an embodiment, a method of moving a robotic arm includes activating an air compressor contained on a workcell to supply air to an air bearing. The air bearing lifts the workcell from a position resting on a support surface to an elevated position. The elevated position allows for low friction movement of the workcell across the support surface. A first guide carriage is engaged with a first guide rail to limit a movement of the workcell across the support surface to a first direction. A first drive system is engaged to propel the workcell across the support surface in the first direction. A second guide carriage is engaged to a second guide rail to limit the movement of the workcell across the support surface to a second direction. A second drive system is engaged to propel the workcell across the support surface in the second direction.

The first guide carriage may be engaged to a third guide rail to limit a movement of the workcell across the support surface to the first direction. The first drive system may be engaged to propel the workcell across the support surface in the first direction and guided by the third guide rail. The air bearing may be deactivated to lower the workcell to a position resting on the support surface. A first robotic arm that is attached to the workcell may be activated.

A first power rail may be engaged to receive power for the compressor during the movement of the workcell across the support surface in the first direction. A second power rail may be engaged to receive power for the compressor during the movement of the workcell across the support surface in the second direction. A third power rail may be engaged to receive power for the compressor during the movement of the workcell across the support surface in the first direction while the workcell is being guided by a third guide rail. The air bearing may be deactivated to lower the workcell to a position resting on the support surface. Power for a robotic arm that is attached to the workcell may be received via the third power rail.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that this application be construed to include other alternative embodiments of the invention except insofar as limited by the prior art.

What is claimed is:

1. A mobile self-contained robotic workcell, comprising:
a multi-degree of freedom robot arm;
a gantry supporting said robot arm;
an air bearing that selectively lifts said gantry off of a supporting surface for low-friction movement;
a first drive system that engages a first drive surface while said gantry is lifted off of said supporting surface by said air bearing to propel said gantry in a first direction;
a second drive system that engages a second drive surface while said gantry is lifted off of said supporting surface by said air bearing to propel said gantry in a second direction; and,
a first guide carriage that engages a first guide track, the first guide carriage limiting said gantry to movement in said first direction.

2. The workcell of claim 1, further comprising:
an air compressor supported by said gantry that supplies compressed air to said air bearing for selectively lifting said gantry off of said supporting surface.

3. The workcell of claim 1, further comprising:
power rail contacts providing power to at least one device supported by the gantry, the at least one device including the robot arm.

4. The workcell of claim 1, wherein the first direction is determined by a first guide rail fixed in relation to said supporting surface.

5. The workcell of claim 4, wherein said second direction is determined by a second guide rail fixed in relation to said supporting surface and said second direction is approximately perpendicular to said first direction.

6. The workcell of claim 1, wherein said supporting surface comprises said first drive surface and said second drive surface.

7. The workcell of claim 1, wherein said first drive system is steered by a first guide rail fixed in relation to said supporting surface.

8. The workcell of claim 7, wherein said second drive system is steered by a second guide rail and said first guide rail comprises a plurality of discontinuous sections, at least two of said plurality of discontinuous sections being separated in a longitudinal direction by a distance sufficient to allow said air bearing to pass between said two of said plurality of discontinuous sections.

9. A mobile self-contained robotic arm workcell, comprising:
a superstructure;
a multi-degree of freedom robotic arm supported by said superstructure;
at least one air bearing, the at least one air bearing selectively lifting said superstructure from a position resting on a support surface to an elevated position, the elevated position allowing for low friction movement of said superstructure across said support surface; and,
a guide carriage that engages a first guide rail that directs a first movement of said superstructure while said superstructure is moved in said elevated position.

10. The workcell of claim 9, further comprising:
power rail contacts providing power to at least one device supported by the superstructure, the at least one device including an air compressor that supplies compressed air to said at least one air bearing.

11. The workcell of claim 9, wherein said first guide rail that directs said first movement of said superstructure directs said superstructure in a first direction and a second guide rail directs a second movement of said superstructure in a second direction.

12. The workcell of claim 9, wherein said first guide rail that directs said first movement of said superstructure and a second guide rail both direct said superstructure in a first direction.

13. The workcell of claim 12, wherein said first guide rail and said second guide rail are separated by a gap that allows said air bearing to pass in a second direction between said first guide rail and said second guide rail.

14. The workcell of claim 13, further comprising a second guide carriage that engages said second rail while said first guide carriage is disposed in said gap.

15. A method of moving a robotic arm workcell, comprising:
activating an air compressor contained on the workcell that supplies air to an air bearing, the air bearing lifting the workcell from a position resting on a support surface to an elevated position, the elevated position allowing for low friction movement of said workcell across said support surface;
engaging a first guide carriage to a first guide rail to limit a movement of said workcell across said support surface to a first direction;
engaging a first drive system to propel said workcell across said support surface in said first direction;
engaging a second guide carriage to a second guide rail to limit said movement of said workcell across said support surface to a second direction; and,
engaging a second drive system to propel said workcell across said support surface in said second direction.

16. The method of claim 15, further comprising:
engaging said first guide carriage to a third guide rail to limit a movement of said workcell across said support surface to said first direction; and,
engaging said first drive system to propel said workcell across said support surface in said first direction and guided by said third guide rail.

17. The method of claim 16, further comprising:
deactivating said air bearing to lower the workcell to a position resting on said support surface.

18. The method of claim 17, further comprising:
activating a first robotic arm that is attached to said workcell.

19. The method of claim 15, further comprising:
engaging a first power rail to receive power for said compressor during said movement of said workcell across said support surface in said first direction; and,
engaging a second power rail to receive power for said compressor during said movement of said workcell across said support surface in said second direction.

20. The method of claim 19, further comprising:
engaging a third power rail to receive power for said compressor during said movement of said workcell across said support surface in said first direction while said workcell is being guided by a third guide rail;
deactivating said air bearing to lower the workcell to a position resting on said support surface;
receiving, via said third power rail, power for a first robotic arm that is attached to said workcell; and,
activating said first robotic arm.

* * * * *